(12) United States Patent
Kim (10) Patent No.: US 11,228,980 B2
(45) Date of Patent: Jan. 18, 2022

(54) TERMINAL DEVICE AND METHOD FOR TRANSMITTING UPLINK DATA (71) Applicant: SK TELECOM CO., LTD., Seoul (KR)

(72) Inventor: Dong Wook Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 23 days.

(21) Appl. No.: 16/758,777

(22) PCT Filed: Jan. 11, 2018

(86) PCT No.: PCT/KR2018/000525
§ 371 (c)(1),
(2) Date: Apr. 23, 2020

(87) PCT Pub. No.: WO2019/083096
PCT Pub. Date: May 2, 2019

(65) Prior Publication Data
US 2020/0336985 A1 Oct. 22, 2020

(51) Int. Cl.
H04W 52/02 (2009.01)
H04W 72/12 (2009.01)

(52) U.S. Cl.
CPC ..... *H04W 52/0251* (2013.01); *H04W 52/0216* (2013.01); *H04W 72/1268* (2013.01); *H04W 72/1284* (2013.01)

(58) Field of Classification Search
CPC ......... H04W 52/0251; H04W 52/0216; H04W 72/1268; H04W 72/1284; H04W 72/12; H04W 76/28; Y02D 30/70
See application file for complete search history.

(56) References Cited

U.S. PATENT DOCUMENTS

| 8,238,837 | B2 | 8/2012 | Womack et al. |
| 9,408,142 | B2 | 8/2016 | Zhu et al. |
| 2017/0208619 | A1* | 7/2017 | Yang ................ H04W 72/1284 |
| 2019/0166553 | A1* | 5/2019 | Ryoo ................ H04W 74/0833 |

FOREIGN PATENT DOCUMENTS

| EP | 3154299 A1 | 4/2017 |
| KR | 10-2012-0028402 A | 3/2012 |
| KR | 10-2017-0118074 A | 10/2017 |
| WO | WO 2011-123535 A1 | 10/2011 |

OTHER PUBLICATIONS

Geza et al. Service aware adaptive DRX scheme Globecom 2014 workshop 2014 (Year: 2014).*

(Continued)

*Primary Examiner* — Rina C Pancholi
(74) *Attorney, Agent, or Firm* — Fenwick & West LLP (57) ABSTRACT As uplink data can be transmitted without delay even in a situation where DRX related to battery consumption reduction is being operated, in the same manner as when DRX is not operated, the present invention proposes a terminal device and an uplink data transmission technology, which not only can achieve battery consumption reduction, but also can process, without delay, various low latency services to be newly provided in 5G.

6 Claims, 5 Drawing Sheets

(56) References Cited

OTHER PUBLICATIONS

PCT International Search Report (with English Translation) and Written Opinion, International Application No. PCTZKR2018Z000525, dated Jul. 20, 2018, 13 Pages.
Korean Intellectual Property Office, Office Action for Korean Application No. 10-2017-0139294, dated Feb. 7, 2020, 7 Pages (with English Translation).
Huawei, Hisilicon, "Potential enhancements for HRLLC based on sTTI," 3GPP TSG-RAN2 Meeting #99bis, Prague, Czech Republic, Oct. 2017, pp. 1-3.
Korean Intellectual Property Office, Office Action, KR Patent Application No. 10-2017-0139294, dated Dec. 23, 2020, eight pages.

\* cited by examiner

FIG. 1

PRIOR ART

FIG. 2

PRIOR ART

TERMINAL DEVICE AND METHOD FOR TRANSMITTING UPLINK DATA

TECHNICAL FIELD

The present disclosure relates to transmission of uplink data by a terminal apparatus to which a Discontinuous Reception (DRX) function for reducing battery consumption is applied and, more particularly, to transmission of uplink data by a terminal apparatus with a DRX function without any delay.

BACKGROUND ART

A 3GPP 4G Long-Term Evolution (LTE) system supports a Discontinuous Reception (DRX) function to reduce battery consumption of a terminal. A current 3GPP 5G New Radio (NR) system (hereinafter, referred to as a 5G communication system) also defines a standard for supporting the DRX function.

Meanwhile, the 5G communication system is expected to to provide a service with low latency (hereinafter, a low-latency service) on the basis of a Ultra Reliable and Low Latency (URLLC) service scenario.

The 5G communication system may apply a DRX function which is the same as that defined in the 4G LTE standard, and accordingly, it is highly likely to apply the DRX function which is the same as that defined in the 4G LTE standard to a URLLC service defined in a 3GPP TR 38.804 standard.

Meanwhile, when uplink data is generated by an application layer of the terminal to which the DRX function is applied, a Scheduling Request (SR) should be transmitted to acquire uplink radio resources for transmitting the generated uplink data.

However, an SR transmission time point is not clearly specified in the 3GPP TR 38.804 standard. Accordingly, when an MAC layer receives uplink data from the application layer during an inactive time of the DRX cycle, the terminal apparatus with the DRX function may transmit the SR in an active time after the current inactive time ends instead of immediately transmitting the SR.

In other words, the 3GPP TR 38.804 standard does not define the time point at which the SR is transmitted, and thus the terminal based on the 5G communication system may not transmit uplink data, which is generated in the inactive time, in the inactive time but may transmit the uplink data in the following active time. Due to transmission delay of the uplink data, a quality of a low-latency service (for example, a URLLC service) to be provided by the 5G communication system may deteriorate.

Accordingly, in order to improve the quality of the low-latency service provided by a communication system such as the 5G communication system, it is necessary to transmit uplink data without any delay when a terminal apparatus with the DRX function is requested to transmit the uplink data, as in the case of a DRX function not being applied.

DETAILED DESCRIPTION OF THE INVENTION

Technical Problem

The present disclosure has been made to solve the problem, and an aspect of the present disclosure is to allow uplink data to be transmitted without any delay as in the case of a DRX function not being applied when a terminal apparatus with the DRX function related to reduction in battery consumption is requested to transmit the uplink data.

Technical Solution

In accordance with an aspect of the present disclosure, a terminal apparatus is provided. The terminal apparatus includes: an identification unit configured to identify specific uplink data; and a transmission management unit configured to, when a request for transmitting the specific uplink data is made in an inactive time among an active time and the inactive time, determine whether to transmit the specific uplink data in the inactive time on the basis of configuration information related to transmission of uplink data.

The active time may be configured to transmit uplink data, and the inactive time may be configured not to transmit uplink data.

When a request for transmitting the specific uplink data is made in the active time, the transmission management unit may be configured to transmit the specific uplink data in the active time regardless of the configuration information.

The configuration information may include at least one piece of first configuration information for determining whether to transmit the uplink data in the inactive time by a network operator and second configuration information for determining whether to transmit the uplink data in the inactive time by a service related to the uplink data.

The transmission management unit may be configured to, when the request for transmitting the specific uplink data is made in the inactive time, transmit a Scheduling Request (SR) to transmit the specific uplink data in the inactive time on the basis of at least one piece of the first configuration information and the second configuration information.

The transmission management unit may be configured to transmit the scheduling request to transmit the specific uplink data in the inactive time when the first configuration information and the second configuration information are set to transmit the specific uplink data in the inactive time, and transmit the scheduling request to transmit the specific uplink data in an active time after the inactive time when at least one piece of the first configuration information and the second configuration information is set not to transmit the specific uplink data in the inactive time.

In accordance with another aspect of the present disclosure, a method of transmitting uplink data is provided. The method includes: an identification step of identifying specific uplink data; and a transmission management step of, when a request for transmitting the specific uplink data is made in an inactive time among an active time and the inactive time, determining whether to transmit the specific uplink data in the inactive time on the basis of configuration information related to transmission of uplink data.

The active time may be configured to transmit uplink data, and the inactive time is configured not to transmit uplink data.

The transmission management step may include, when a request for transmitting the specific uplink data is made in the active time, transmitting the specific uplink data in the active time regardless of the configuration information.

The configuration information may include at least one piece of first configuration information for determining whether to transmit the uplink data in the inactive time by a network operator and second configuration information for determining whether to transmit the uplink data in the inactive time by a service related to the uplink data.

The transmission management step may include, when the request for transmitting the specific uplink data is made in the inactive time, transmitting a Scheduling Request (SR) to transmit the specific uplink data in the inactive time on the basis of at least one piece of the first configuration information and the second configuration information.

The transmission management step may include transmitting the scheduling request to transmit the specific uplink data in the inactive time when the first configuration information and the second configuration information are set to transmit the specific uplink data in the inactive time, and transmitting the scheduling request to transmit the specific uplink data in an active time after the inactive time when at least one piece of the first configuration information and the second configuration information is set not to transmit the specific uplink data in the inactive time.

Advantageous Effects

According to a terminal apparatus for transmitting uplink data and a method of transmitting uplink data of the present disclosure, it is possible to achieve an effect of reducing battery consumption and improving a quality of a low-latency service by transmitting uplink data without any delay as in the case in which a DRX function is not applied when a terminal apparatus, to which the DRX function related to reduction in battery consumption is applied, is requested to transmit the uplink data.

MODE FOR CARRYING OUT THE INVENTION

Hereinafter, embodiments of the present disclosure will be described with reference to the accompanying drawings.

According to an embodiment of the present disclosure, a terminal to which a DRX function related to reduction in battery consumption is applied may transmit uplink data without any latency like a terminal to which no DRX function is applied.

Specifically, according to an embodiment of the present disclosure, when various low-latency services of a 5G communication is applied to the terminal to which the DRX function related to reduction in battery consumption is applied, uplink data can be transmitted without any latency in spite of the DRX function. Therefore, an effect of reducing battery consumption and preventing latency of various low-latency services can be achieved according to an embodiment of the present disclosure.

Hereinafter, Uplink (UL) scheduling and a DRX operation will be described with reference to FIGS. 1 and 2.

Like a 4G Long-Term Evolution (LTE) system, a 5G communication system adopts Orthogonal Frequency Division Multiplexing (OFDM) for physical layers. Further, a UL scheduling operation is also being currently standardized on the basis of the 4G LTE standard.

In the 5G NR standard, a Random Access (RA) procedure and a Scheduling Request (SR)/Buffer Status Reporting (BSR) procedure are performed according to whether there is a Radio Resource Control (RRC) connection between a terminal apparatus and a base station and whether there are uplink radio resources (hereinafter, referred as UL radio resources) at a time point at which transmission of uplink data is triggered.

Figure 1:
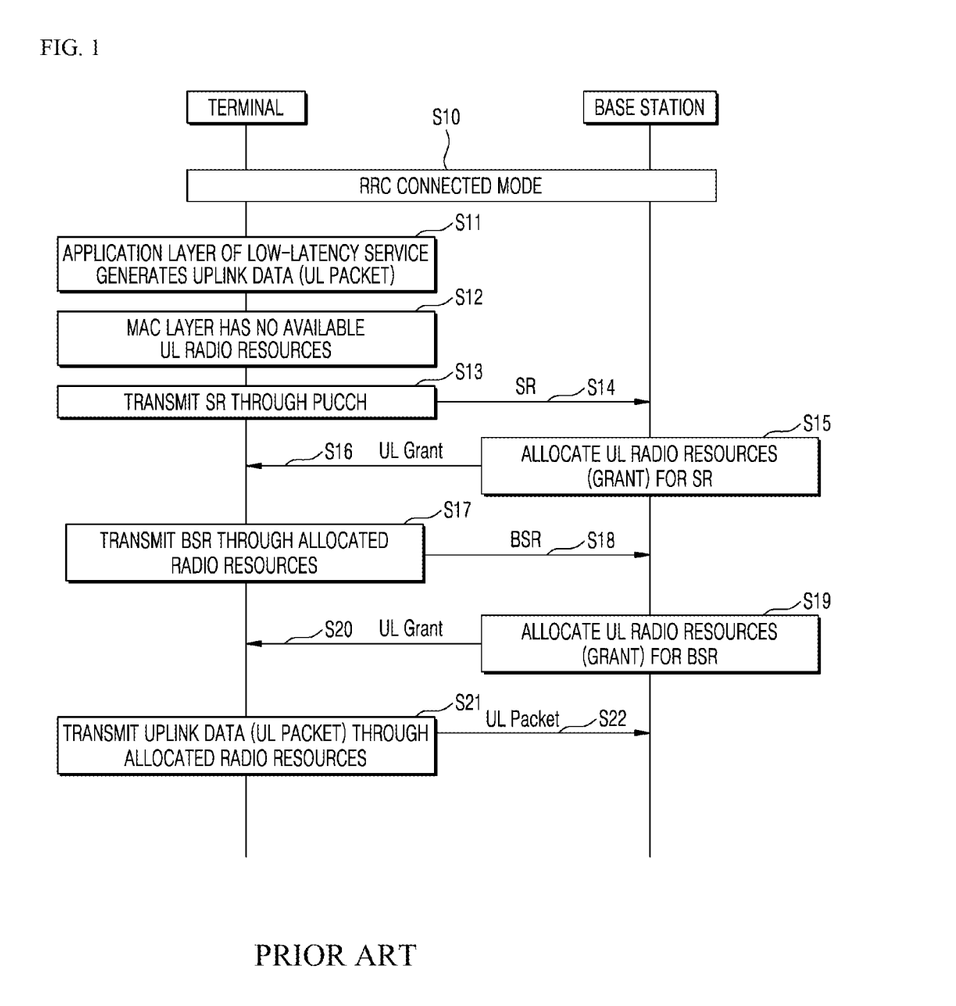
FIG. 1 illustrates a conventional uplink data transmission scheduling procedure.

According to an embodiment of the present disclosure, in the state in which the terminal apparatus and the BS are connected to each other as illustrated in FIG. 1, radio resources are allocated through an SR/BSR procedure and uplink data is transmitted.

Specifically, as illustrated in FIG. 1, when a connection configuration between the terminal apparatus and the base station is an "RRC_CONNECTED" mode in S10, an application layer that provides a low-latency service (for example, a URLLC service) generates uplink data and transfers the same to an MAC layer of the terminal in S11. The MAC layer identifies whether there are available uplink radio resources for transmitting uplink data on the basis of a downlink control channel (Physical Downlink Control Channel (PDCCH)) in S12.

If there are no available uplink radio resources for the PDCCH, the MAC layer transmits the SR through a Physical Uplink Control Channel (PUCCH) and makes a request for allocating uplink radio resources in S13 and S14. When uplink radio resources are allocated by the base station, information on the size of uplink data to be transmitted is transmitted through the BSR in S15 to S18.

Thereafter, when uplink radio resources are allocated by the base station in response to the BSR, the MAC layer transmits uplink data through the allocated uplink radio resources in S19 to S21. Since a detailed operation other than the above-described operation is irrelevant to the present disclosure, a detailed description will be omitted.

Meanwhile, when the connection configuration between the terminal apparatus and the base station is the "RRC_CONNECTED" mode as illustrated in FIG. 1, the operation of the DRX function is defined in the 4G LTE standard to reduce battery consumption of the terminal apparatus.

Specifically, in the 4G LTE communication system, the terminal apparatus and the base station share parameter information related to the DRX function through an "RRC Reconfiguration" procedure. For example, a DRX cycle related to the DRX function may be configured through parameter information related to the DRX function, and the DRX cycle may include an active time and an inactive time.

Figure 2:
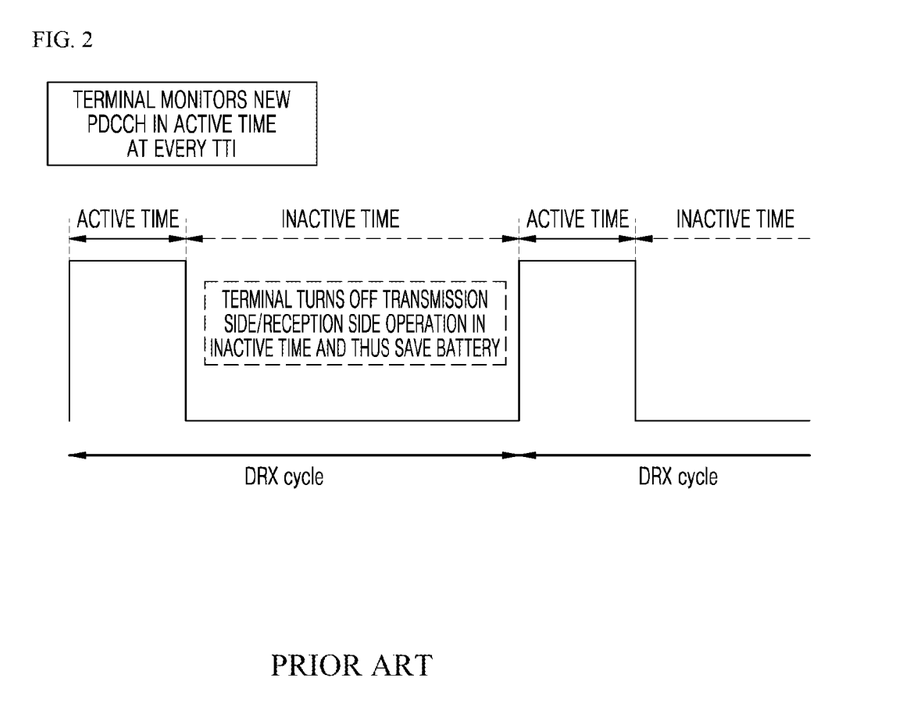
FIG. 2 illustrates a conventional DRX operation scheme.

As illustrated in FIG. 2, the DRX cycle may include the active time and the inactive time and may be repeated according to a predetermined period.

The terminal apparatus to which the DRX function is applied identifies whether there is uplink/downlink scheduling information allocated to the terminal apparatus by monitoring a Dedicated Physical Control Channel (DPCCH) at a transmission time interval.

Meanwhile, in the inactive time of the DRX cycle, power of a transmitter/receiver of a communication modem is turned off to reduce battery consumption of the terminal apparatus. A detailed operation other than the above-described operation is irrelevant to the present disclosure and thus is omitted.

Since the 5G NR standard is performed according to the DRX function defined in the 4G LTE communication, the DRX function defined in the 4G LTE communication system may be applied to the 5G communication system.

Meanwhile, a transmission rate and transmission efficiency are mainly emphasized in the 4G LTE communication system, but a scheme for reducing transmission latency and increasing reliability as well as a high transmission and transmission efficiency are being considered in the 5G communication system.

In connection with this, in the 5G NR 3PP TS 22.261 standard, URLLC services requiring high reliability and low latency as shown in [Table 1] below are specified. Particularly, it is noted that communication for a scenario of "discrete automation" and "intelligent transport system" of the URLLC service requires super-low latency of 10 ms as "end-to-end latency".

TABLE 1

| Scenario | End-to-End Latency | Jitter | Service availability & Reliability | User experienced data rate | Payload size (Small: <256 bytes) |
|---|---|---|---|---|---|
| Discrete automation | 10 ms | 100 μs | 99.99% | 10 Mbps | Small to big |
| Process automation-remote control | 50 ms | 20 ms | 99.9999% | 1 Mbps up to 100 Mbps | Small to big |
| Process automation-monitoring | 50 ms | 20 ms | 99.9% | 1 Mbps | Small |
| Intelligent transport system - infrastructure backhaul | 10 ms | 20 ms | 99.9999% | 10 Mbps | Small to big |

Meanwhile, when uplink data for a low-latency service is triggered in an inactive time while the terminal apparatus uses the DRX function to reduce battery consumption, the 5G NR 3PP TS 22.261 standard defines that the terminal apparatus transmits an SR for acquiring uplink radio resources to be used for transmitting the uplink data through a PUCCH and then the enters an active state as an SR pending state.

In other words, the 5G NR 3PP TS 22.261 standard does not clearly define an SR transmission time point when uplink data is triggered in the inactive time in the state in which the DRX function is used.

Specifically, in other words, when uplink data is generated by an application layer of the terminal apparatus in the inactive time of the DRX cycle and requested to be transmitted to an MAC layer of the terminal apparatus, a time point when the SR is transmitted for transmission of the uplink data is not clearly defined.

Accordingly, when uplink data is generated in the inactive time, the terminal apparatus transmits the SR in an active time appearing after the inactive time ends.

Further, the 3GPP TR 38.804 and TR 38.913 standards specify that there is no change in the operation of the DRX function for the URLLC service even though the URLLC service is introduced.

Accordingly, when uplink data is generated in the inactive time with respect to a low-latency service to be applied to the 5G communication system, transmission of the uplink data may be delayed until an SR transmission time point for the uplink data. Here, a latency time between the time point at which the uplink data is generated and the time point at which the SR is transmitted is relevant to a length of the inactive time and a time point at which the uplink data is generated in the inactive time.

When the DRX function is applied, such latency that is not generated when the DRX function is not applied is generated. Accordingly, when the DRX function is applied to the 5G communication system, various low-latency services provided by the 5G communication system do not meet requirements.

Accordingly, an embodiment of the present disclosure proposes a method of transmitting uplink data to improve a quality of a low-latency service provided by a communication system such as the 5G communication system.

Specifically, an embodiment of the present disclosure proposes a method of, when the terminal apparatus to which the DRX function related to reduction in battery consumption is applied is requested to transmit uplink data, transmitting the uplink data without any latency like in the case in which the DRX function is not applied.

Figure 3:
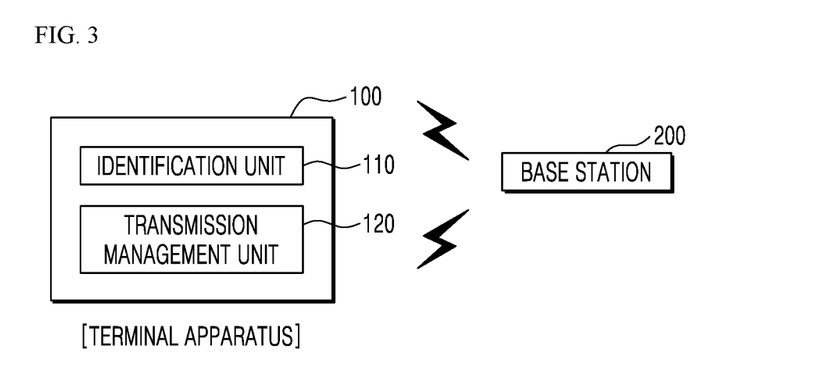
FIG. 3 is a block diagram illustrating a configuration of a terminal apparatus according to an embodiment of the present disclosure.

Hereinafter, a terminal apparatus 100 for uplink data transmission according to an embodiment of the present disclosure will be described in detail with reference to FIG. 3.

The terminal apparatus 100 according to an embodiment of the present disclosure includes an identification unit 110 configured to identify specific uplink data and a transmission management unit 120 configured to, when a request for transmitting specific uplink data in an inactive time included in a specific interval is made, determining whether to transmit the specific uplink data in the inactive time on the basis of configuration information related to uplink data transmission. For example, when the specific uplink data is identified, the transmission management unit 120 may determine whether to minimize latency and transmit the uplink data.

Specifically, an embodiment of the disclosure proposes a detailed method of controlling a time point at which uplink data is transmitted when the DRX function is applied on the basis of a DRX cycle in the state in which the connection configuration between the terminal apparatus 100 and a base station 200 is an "RRC_CONNECTED" mode and the uplink data is identified in an inactive time included in the DRX cycle.

The identification unit 110 identifies specific uplink data requested to be transmitted.

For example, when an application layer of the terminal apparatus generates specific uplink data related to a low-latency service and transmits the uplink data to a MAC layer, the identification unit 110 may identify the uplink data transmitted to the MAC layer as specific uplink data requested to be transmitted in a specific interval.

The specific interval may be a DRX cycle including the active time and the inactive time. At this time, the active time is configured to transmit uplink data, and the inactive time is configured not to transmit uplink data. Hereinafter, for convenience of description, the specific interval is described as the DRX cycle.

The identification unit 110 identifies whether specific uplink data is generated and requested to be transmitted in the DRX cycle.

The transmission management unit 120 determines whether to immediately transmit specific uplink data in the inactive time on the basis of configuration information related to uplink data transmission. Alternatively, when a request for transmitting specific uplink data in the inactive time among the active time and the inactive time included in the DRX cycle is made, the transmission management unit 120 determines whether to immediately transmit specific uplink data on the basis of configuration information related to uplink data transmission. If a request for transmitting specific uplink data in the active time is made, the specific uplink data is immediately transmitted regardless of configuration information.

The configuration information may be determination reference information preset for determining whether to immediately transmit uplink data when a request for transmitting the uplink data in the inactive time is made. That is, the configuration information may be information for determining whether to immediately transmit the uplink data in the inactive time before the following active time does not arrive when the request for transmitting the uplink data in the inactive time is made.

The configuration information may include at least one piece of first configuration information for determining whether to immediately transmit uplink data in the inactive time by a network operator and second configuration information for determining whether to immediately transmit uplink data in the inactive time by a service related to the uplink data.

For example, the first configuration information may be information for determining whether to transmit uplink data in the inactive time or when the following active time arrives according to a configuration of the network operator. The second configuration information may be information for determining whether to transmit uplink information in the inactive time or when the following active time arrives according to a service type.

The first configuration information and the second configuration information may include a configuration value for immediately transmitting specific uplink data in the inactive time or a configuration value for preventing immediate transmission of specific uplink data in the inactive time.

According to an embodiment of the present disclosure, when configuration information is not predetermined according to the network operator or the service type, specific uplink data may be immediately transmitted in the inactive time. In this case, transmission of uplink data is not delayed by the DRX function, and thus there is a possibility of meeting requirements of various low-latency services provided by a communication system such as the 5G communication system.

However, when uplink data requested in the inactive time is immediately transmitted in the inactive time, battery consumption may increase. For example, when uplink data requested in the inactive time is immediately transmitted in the inactive time in the 5G communication system, battery consumption may be larger than that in the 4G LTE communication system to which the DRX function is applied.

Accordingly, in an embodiment of the present disclosure, whether to immediately transmit uplink data in the inactive time when a request for transmitting the uplink data in the inactive time is preset by the network operator or preset according to the service type. The configuration information may be set during a process of setting an "RRC reconfiguration" between the terminal apparatus and the base station.

When a request for transmitting specific uplink data in the inactive time is made in the state in which configuration information including at least one piece of the first configuration information and the second configuration information, the transmission management unit 120 transmits an SR to the base station so that the specific uplink data is immediately transmitted in the inactive time on the basis of at least one piece of the first configuration information and the second configuration information.

Figure 4:
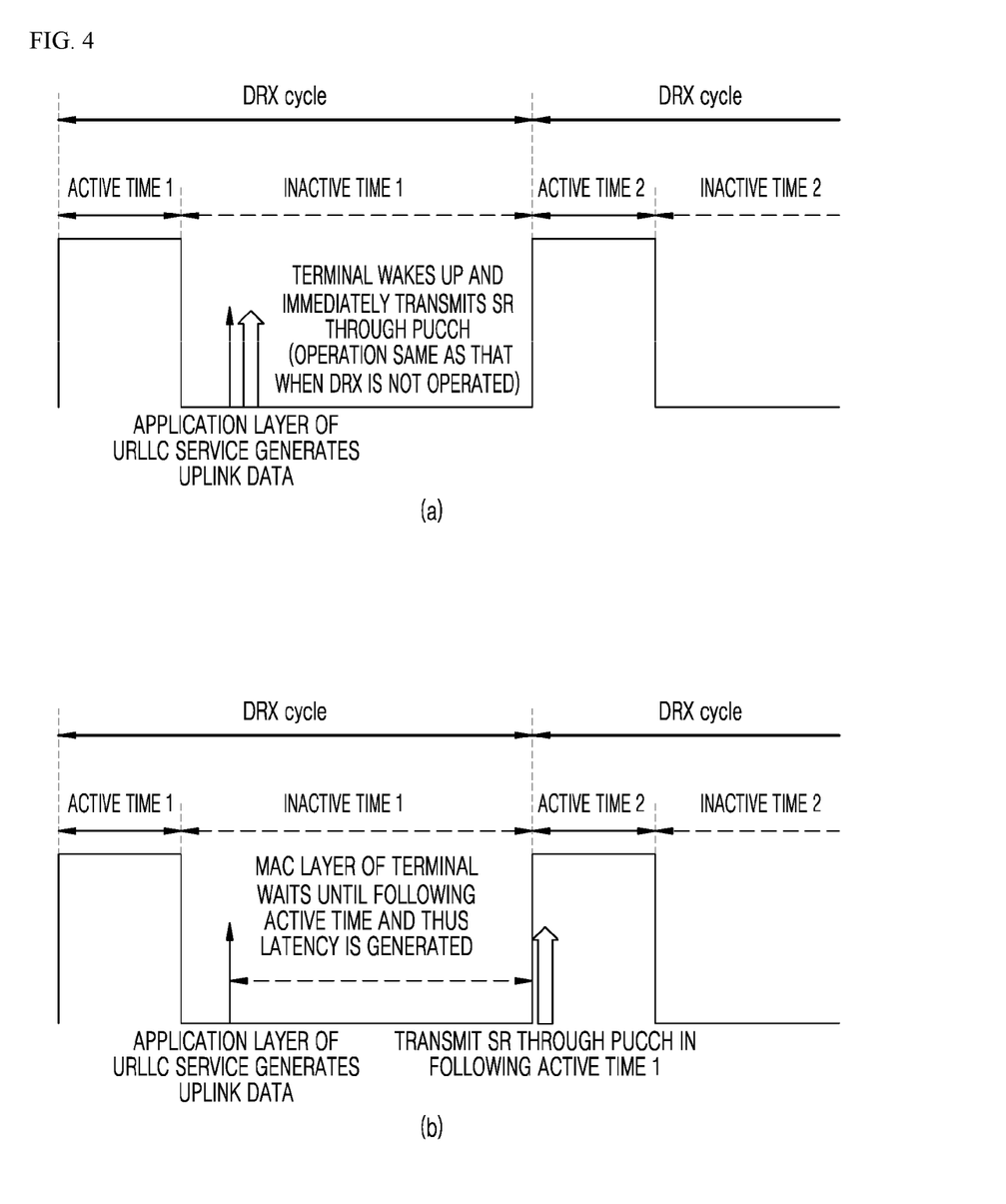
FIG. 4 illustrates an uplink data transmission scheduling procedure according to an embodiment of the present disclosure.

Specifically, when a configuration value for immediately transmitting specific uplink data in the inactive time is included in both the first configuration information and the second configuration information, the transmission management unit 120 transmits the SR to the base station to immediately transmit the specific uplink data in inactive time 1 in which a request for transmitting the specific uplink data is made as illustrated in FIG. 4A.

Specifically, the terminal apparatus wakes up and transmits the SR to the base station through a PUCCH in inactive time 1, and the base station allocates resources for transmitting specific uplink data in response to the SR. Accordingly, the specific uplink data may be transmitted in inactive time 1. In this case, it is considered that transmission of the specific uplink data is not delayed. However, since the terminal apparatus wakes up and transmits the SR in inactive time 1, battery consumption of the terminal apparatus may increase.

Meanwhile, when a configuration value for preventing immediate transmission of specific uplink data is included in one of the first configuration information and the second configuration information, the transmission management unit 120 transmits the SR to the base station to transmit the specific uplink data in inactive time 2 arriving after inactive time 1 in which a request for transmitting the specific uplink data is made as illustrated in FIG. 4B.

Specifically, the terminal apparatus does not wake up in inactive time 1 but wakes up inactive time 2 and transmits the SR to the base station through a PUCCH, and the base station allocates resources for transmitting specific uplink data in response to the SR. Accordingly, specific uplink data may not be transmitted inactive time 1 and may be transmitted in inactive time 2. In this case, it is considered that transmission of specific uplink data is delayed until inactive time 2 arrives. However, since the terminal apparatus neither wakes up nor transmits the SR in inactive time 1, battery consumption of the terminal apparatus may decrease.

As a result, according to an embodiment of the present disclosure, when a request for transmitting specific uplink data is made in inactive time 1, the specific uplink data may be immediately transmitted in the inactive time or transmitted after a predetermined time until inactive time 2 right after inactive time 1 arrives according to the network operator or the service type on the basis of predetermined configuration information. Accordingly, an effect of reducing battery consumption and an effect of preventing latency of transmission of uplink data may be achieved at the same time.

Figure 5:
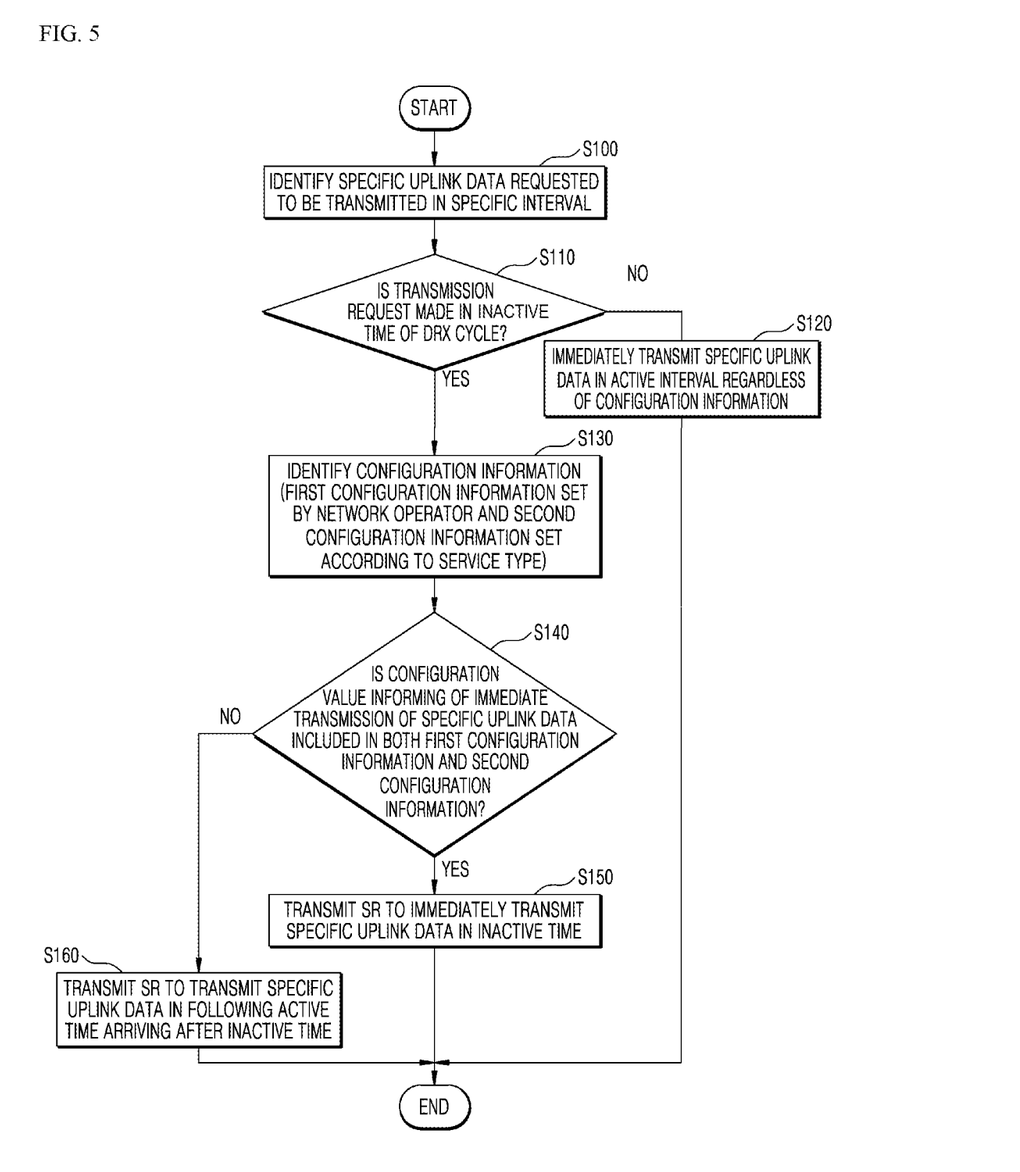
FIG. 5 is a flowchart illustrating a method of transmitting uplink data by a terminal apparatus according to an embodiment of the present disclosure.

Hereinafter, a method of transmitting uplink data according to an embodiment of the present disclosure is described with reference to FIG. 5.

The method of transmitting uplink data according to an embodiment of the present disclosure includes an identification step of identifying specific uplink data and a transmission management step of, when a request for transmitting the specific uplink data is made in an inactive time among an active time and the inactive time, determining whether to transmit the specific uplink data in the inactive time on the basis of configuration information related to transmission of uplink data.

The method of transmitting uplink data according to an embodiment of the present disclosure is based on the assumption that the connection configuration between the terminal apparatus 100 and the base station 200 is the "RRC_CONNECTED" mode and the DRX function is applied to the terminal apparatus 100.

The terminal apparatus 100 identifies specific uplink data. Specifically, when an application layer of the terminal apparatus 100 generates uplink data related to a low-latency service and transmits the uplink data to a MAC layer of the terminal apparatus 100, the uplink data transmitted to the MAC layer may be identified as specific uplink data requested to be transmitted in a specific interval.

The specific interval may be a DRX cycle including an active time and an inactive time and may be periodically repeated. At this time, the active time is configured to transmit uplink data, and the inactive time is configured not to transmit uplink data. Hereinafter, for convenience of description, the specific interval is described as a DRX cycle.

The terminal apparatus 100 identifies whether specific uplink data is generated and requested to be transmitted while a DRX function is applied on the basis of the DRX cycle.

Specifically, when specific uplink data to be transmitted according to the DRX cycle is identified, the terminal apparatus 100 identifies whether a request for transmitting specific uplink data is made in an inactive time of the DRX cycle in S110.

When the request for transmitting the specific uplink data is made in an active time of the DRX cycle on the basis of the result of the determination in step S110, the terminal apparatus 100 immediately transmits the specific uplink data in S120 regardless of configuration information described below. When the request for transmitting the specific uplink data is made in the active time of the DRX cycle, the terminal apparatus 100 may transmit an SR to make a request for allocating resources for transmitting the uplink data in the active time regardless of configuration information described below.

Meanwhile, when the request for transmitting the specific uplink data is made in the inactive time of the DRX cycle on the basis of the result of the determination in step S110, the terminal apparatus 100 identifies configuration information related to transmission of the uplink data in S130.

The configuration information may be information preset for determining whether to immediately transmit uplink data in the inactive time when the request for transmitting the uplink data is made in the inactive time. The configuration information includes at least one piece of first configuration information for determining whether to immediately transmit uplink data in the inactive time by a network operator and second configuration information for determining whether to immediately transmit uplink data in the inactive time by a service related to the uplink data.

The first configuration information and the second configuration information may include a configuration value for immediately transmitting specific uplink data in the inactive time or a configuration value for preventing immediate transmission of specific uplink data in the inactive time.

When a request for transmitting specific uplink data made in the inactive time in the state in which at least one piece of the first configuration information and the second configuration information is preset, the terminal apparatus 100 determines whether to immediately transmit the specific uplink data in the inactive time on the basis of at least one piece of the first configuration information and the second configuration information in S140.

When a configuration value for immediately transmitting specific uplink data in the inactive time is included in both the first configuration information and the second configuration information on the basis of the determination result of step S140 (Yes of S130), the terminal apparatus 100 transmits an SR to the base station to immediately transmit the specific uplink data in inactive time 1 in which a request for transmitting the specific uplink data is made in S150 as illustrated in FIG. 4A.

Specifically, the terminal apparatus 100 wakes up and transmits the SR to the base station through a PUCCH in inactive time 1, and the base station allocates resources for transmitting specific uplink data in response to the SR as illustrated in FIG. 4A. Accordingly, the specific uplink data may be transmitted in inactive time 1. In this case, it is considered that transmission of the specific uplink data is not delayed. However, since the terminal apparatus wakes up and transmits the SR in inactive time 1, battery consumption of the terminal apparatus may increase.

Meanwhile, when a configuration value for preventing immediate transmission of specific uplink data is included in one of the first configuration information and the second configuration information on the basis of the determination result of step S140 (No of S130), the terminal apparatus 100 transmits the SR to the base station to transmit the specific uplink data in inactive time 2 arriving after inactive time 1 in which a request for transmitting the specific uplink data is made in S160 as illustrated in FIG. 4B.

Specifically, the terminal apparatus 100 does not wake up in inactive time 1 but wakes up and transmits the SR to the base station through the PUCCH in inactive time 2 as illustrated in FIG. 4B, and the base station allocates resources for transmitting specific uplink data in response to the SR. Accordingly, specific uplink data may not be transmitted inactive time 1 and may be transmitted in inactive time 2. In this case, it is considered that transmission of specific uplink data is delayed until inactive time 2 arrives. However, since the terminal apparatus neither wakes up nor transmits the SR in inactive time 1, battery consumption of the terminal apparatus may decrease.

As a result, according to an embodiment of the present disclosure, when a request for transmitting specific uplink data is made in inactive time 1, the specific uplink data may be immediately transmitted in the inactive time or transmitted after a predetermined time until inactive time 2 right after inactive time 1 arrives according to the network operator or the service type. Accordingly, an effect of reducing battery consumption and an effect of preventing latency of transmission of uplink data may be achieved at the same time.

As described above, according to the terminal apparatus and the method of transmitting uplink data of the present disclosure, like in the case in which DRX is not operated, uplink data can be transmitted without any latency in the state in which DRX related to reduction in battery consumption is operated, so that an effect of reducing battery consumption and an effect of processing various low-latency services to be newly provided by 5G without any latency can be obtained at the same time, and thus the overall service satisfaction and quality can be improved.

The terminal apparatus and the method of transmitting uplink data according to an embodiment of the present disclosure may be implemented in the form of a program instruction that can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

The invention claimed is:

1. A terminal apparatus comprising:
   a processor; and
   memory coupled to the processor, the memory storing instructions, when executed by the processor cause the processor to:
   identify specific uplink data,
   when a request for transmitting the specific uplink data is made in an inactive time of a discontinuous reception scheme, determine whether to transmit the specific uplink data in the inactive time, based on first configuration information and second configuration information, the first configuration information indicating determination by a network operator to allow transmission of the specific uplink data in the inactive time, the second configuration information indicating determination by a service associated with the specific uplink data to allow the transmission of the specific uplink data in the inactive time,
   transmit the specific uplink data in the inactive time when the first configuration information and the second configuration information are set to transmit the specific uplink data in the inactive time, and
   when the request for transmitting the specific uplink data is made in an active time of the discontinuous reception scheme, transmit the specific uplink data in the active time regardless of the first configuration information and the second configuration information.

2. The terminal apparatus of claim 1, wherein the instructions further cause the processor to, when the request for transmitting the specific uplink data is made in the inactive time, transmit a Scheduling Request (SR) for the specific uplink data in the inactive time, based on the first configuration information or the second configuration information.

3. The terminal apparatus of claim 2, wherein the instructions further cause the processor to:
   transmit the SR for the specific uplink data in the inactive time when the first configuration information and the second configuration information are set to transmit the specific uplink data in the inactive time, and
   transmit the SR for the specific uplink data in another active time after the inactive time when the first configuration information or the second configuration information is set not to transmit the specific uplink data in the inactive time.

4. A method of transmitting uplink data, the method comprising:
   identifying specific uplink data; and
   when a request for transmitting the specific uplink data is made in an inactive time of a discontinuous reception scheme, determining whether to transmit the specific uplink data in the inactive time, based on first configuration information and second configuration information, the first configuration information indicating determination by a network operator to allow transmission of the specific uplink data in the inactive time, the second configuration information indicating determination by a service associated with the specific uplink data to allow the transmission of the specific uplink data in the inactive time,
   transmitting the specific uplink data in the inactive time when the first configuration information and the second configuration information are set to transmit the specific uplink data in the inactive time, and
   when the request for transmitting the specific uplink data is made in an active time of the discontinuous reception scheme, transmitting the specific uplink data in the active time regardless of the first configuration information and the second configuration information.

5. The method of claim 4, wherein
   when the request for transmitting the specific uplink data is made in the inactive time, transmitting a Scheduling Request (SR) for the specific uplink data in the inactive time, based on the first configuration information or the second configuration information.

6. The method of claim 5, further comprising:
   transmitting the SR for the specific uplink data in the inactive time when the first configuration information and the second configuration information are set to transmit the specific uplink data in the inactive time, and
   transmitting the SR for the specific uplink data in another active time after the inactive time when the first configuration information or the second configuration information is set not to transmit the specific uplink data in the inactive time.

* * * * *